July 17, 1956  R. F. GLOCK  2,754,558
MACHINE FOR REMOVING MOLD PARTS FROM A WORKPIECE
Filed April 16, 1953  7 Sheets-Sheet 1

INVENTOR.
Richard F. Glock
BY
His Attorney

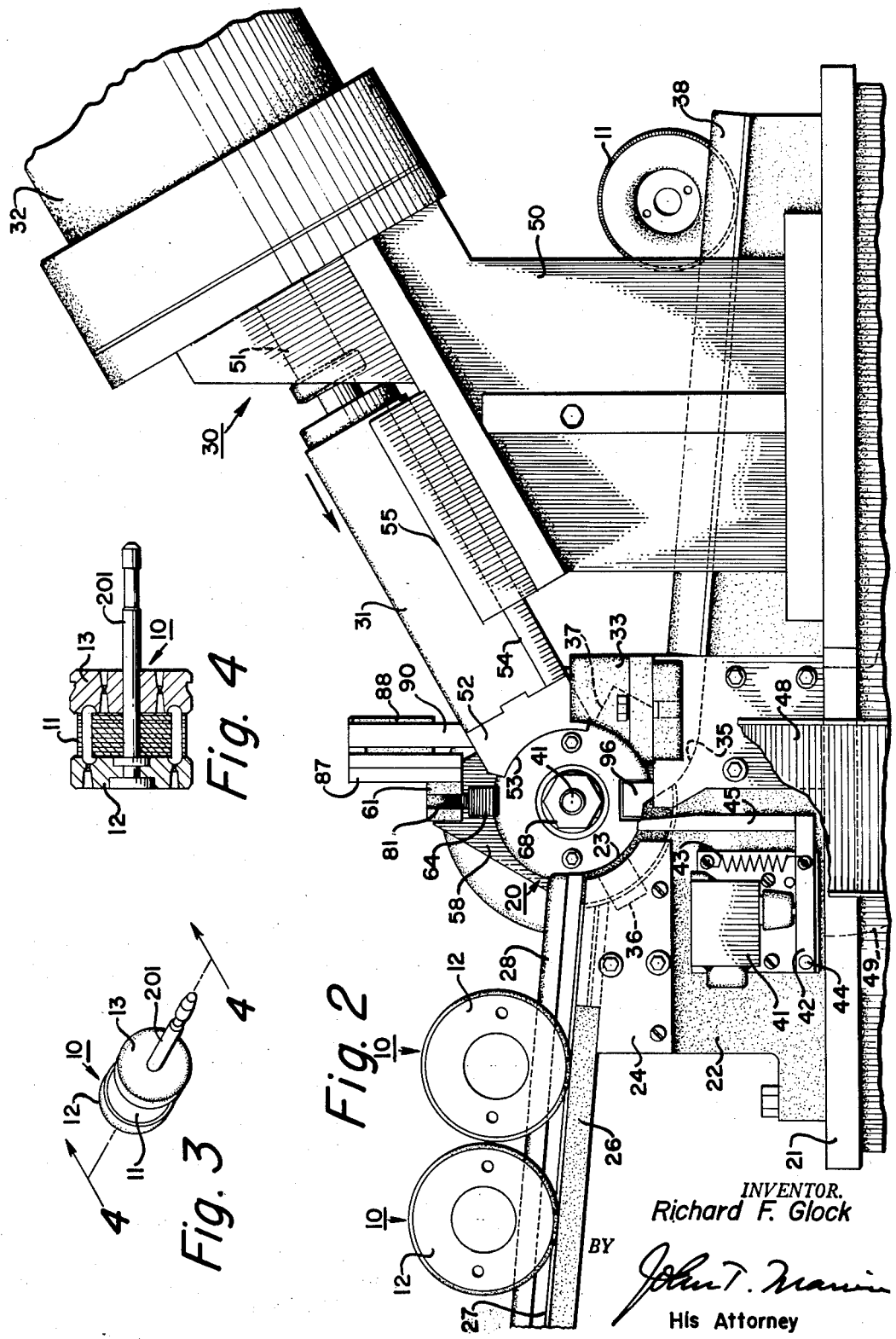

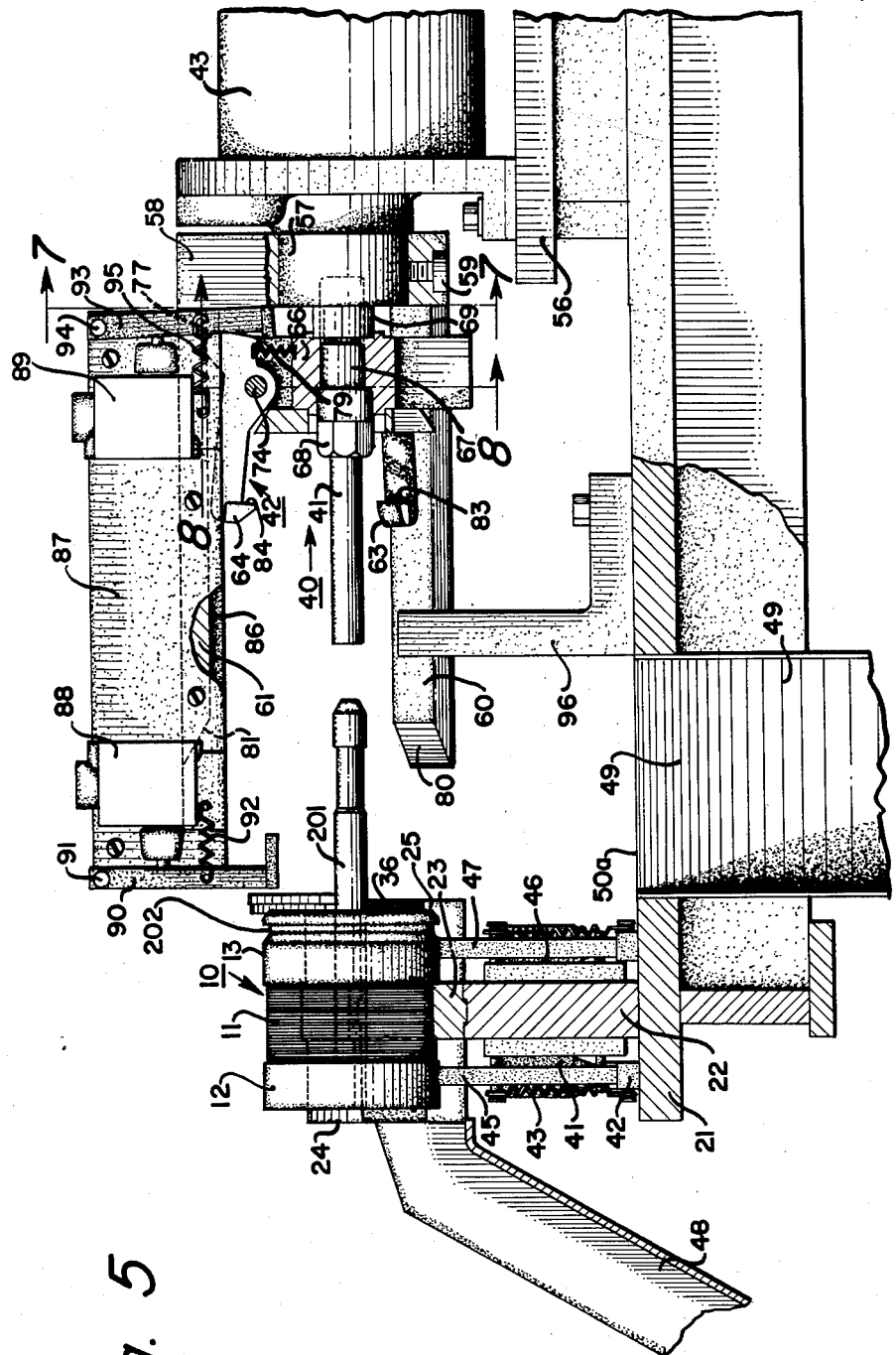

July 17, 1956  R. F. GLOCK  2,754,558
MACHINE FOR REMOVING MOLD PARTS FROM A WORKPIECE
Filed April 16, 1953  7 Sheets-Sheet 4

INVENTOR.
Richard F. Glock
BY
His Attorney

July 17, 1956  R. F. GLOCK  2,754,558
MACHINE FOR REMOVING MOLD PARTS FROM A WORKPIECE
Filed April 16, 1953  7 Sheets-Sheet 5
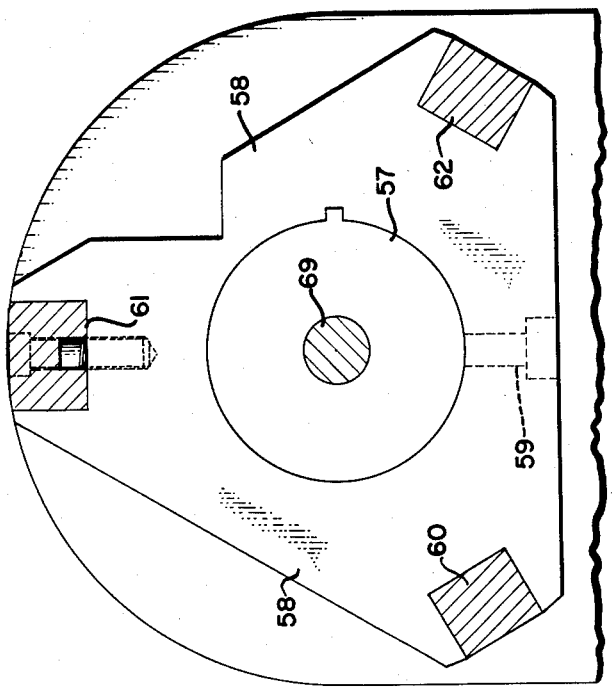
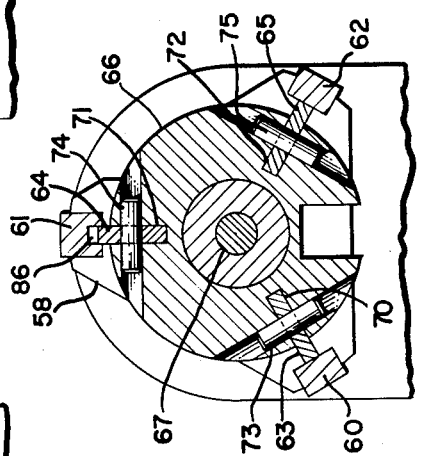
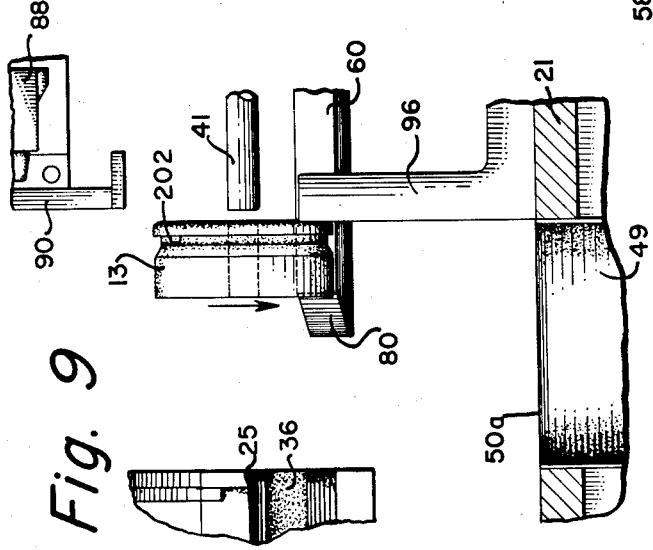
*INVENTOR.*
Richard F. Glock
BY
His Attorney

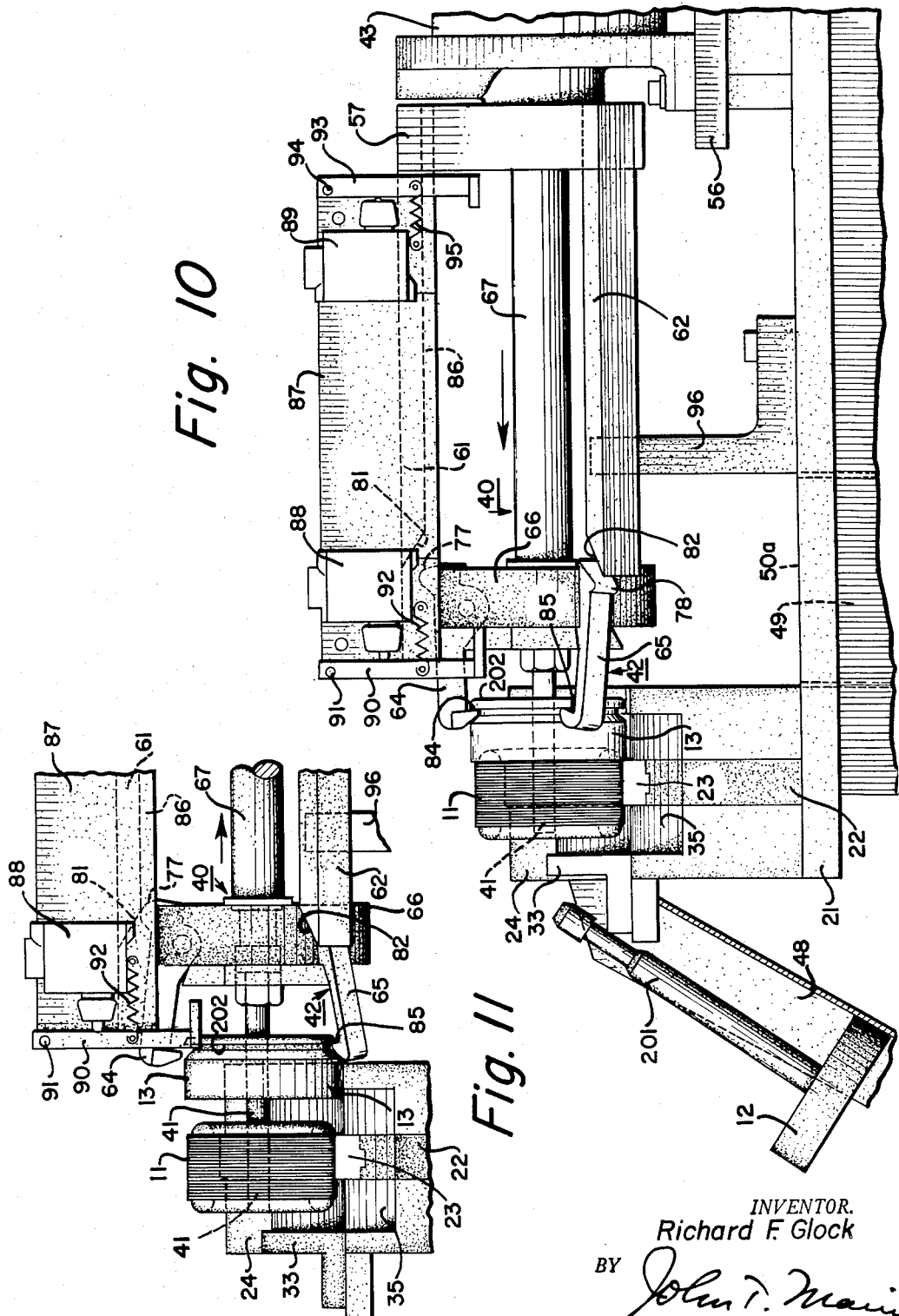

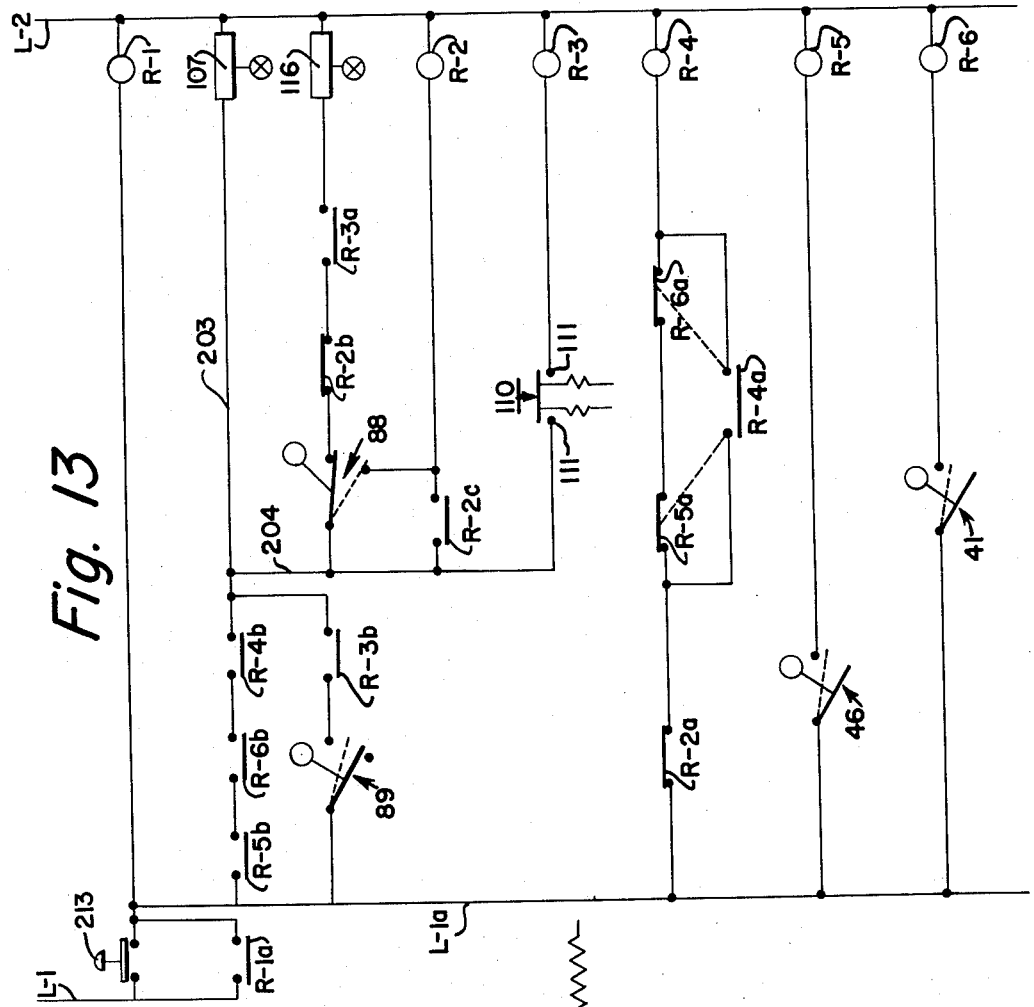

United States Patent Office 2,754,558
Patented July 17, 1956

2,754,558

MACHINE FOR REMOVING MOLD PARTS FROM A WORKPIECE

Richard F. Glock, Dayton, Ohio, assignor to General Motors Corporation, Detroit, Mich., a corporation of Delaware Application April 16, 1953, Serial No. 349,224

5 Claims. (Cl. 22—94)

This invention relates to a machine for removing mold sections from a workpiece.

In the manufacture of certain rotors for dynamoelectric machines it is conventional to die cast conductor bars and end rings in the rotor. This is particularly true in rotors of the squirrel cage type.

When die casting the conductor bars and end rings in a lamination assembly, the mold forms provided at each end of the rotor and in which the end rings for the rotor are formed adhere to the rotor after the die casting operation. The adhesion between the mold forms and the rotor is sufficiently great that considerable pressure is required to break the mold forms from the die cast rotor assembly. Conventionally the mold forms are hammered from the rotor assembly. However, this operation is costly in man hours required to do the job and expensive in the number of rotors that are damaged in the operation.

It is therefore an object of this invention to provide a machine for removing the mold forms from opposite ends of a die cast rotor assembly that will greatly facilitate the removal of the mold forms.

It is another object of the invention to provide a machine for obtaining the result of the foregoing object that is automatic in its operation through at least one cycle of operation for removing the mold forms from a rotor, the machine being set into operation by introduction of a work element into the machine, and stopped by automatic ejection of the work element from the machine.

It is another object of the invention to provide a machine to remove mold forms from opposite ends of a die cast assembly wherein the work element comprising a rotor and a mold form on each end thereof is first rigidly clamped and then the mold forms are sequentially removed from opposite ends of the rotor assembly.

It is still another object of the invention to provide a system of controls for a machine to operate the same automatically through a cycle of operation to first clamp a work element in the machine and thereafter sequentially operate the machine to cause removal of mold elements from opposite ends of a rotor sequentially.

Further objects and advantages of the present invention will be apparent from the following description, reference being had to the accompanying drawings wherein a preferred form of the invention is clearly shown.

In the drawings:

Figure 2 is a side elevational view of the machine of Figure 1 as viewed generally along the line 2—2 of Figure 1.

Figure 3 is a perspective elevational view of a work element on which work is to be done by the machine.

Figure 4 is a transverse cross sectional view of the work element of Figure 3, illustrating the component parts thereof.

Figure 5 is a cross sectional view taken generally along line 5—5 of Figure 1.

Figure 7 is a cross sectional view taken along 7—7 of Figure 5.

Figure 8 is a cross sectional view taken along 8—8 of Figure 5.

Figure 9 is a side elevational view of a machine illustrating the operation of removal of one of the mold forms from a rotor assembly.

Figure 10 is a side elevational view of a portion of the machine illustrating the position of the machine elements in one stage of removing the mold forms from the rotor.

Figure 11 is an elevational view of a portion of the machine illustrating the position of the machine elements for removal of a mold form following the position of the machine elements illustrated in Figure 10.

Figure 12 is a schematic illustration of the pneumatic system for the machine.

Figure 13 is a schematic view of the electrical system for the machine.

Figure 1:
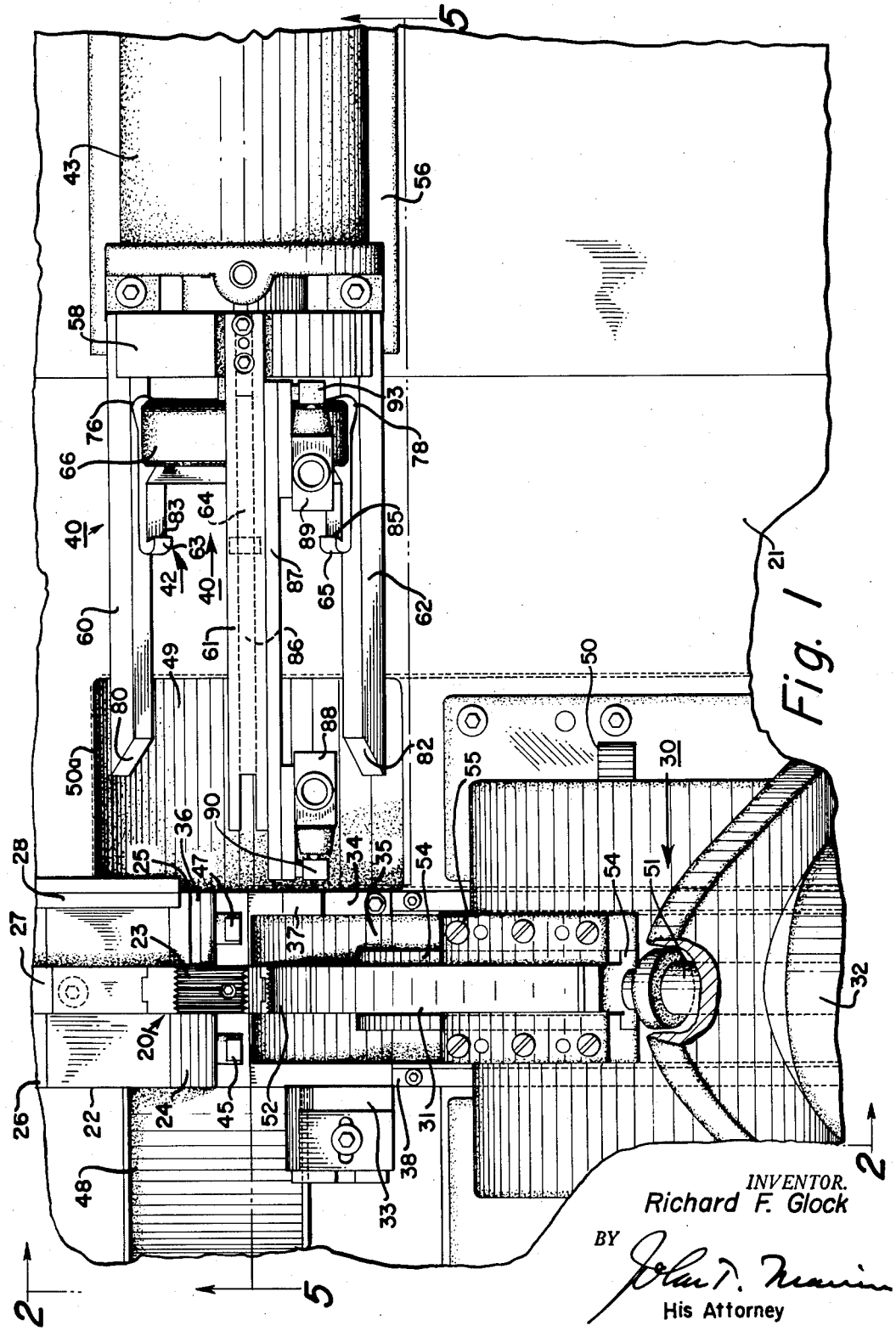
Figure 1 is a plan view of a machine incorporating the features of this invention, certain portions of the machine being broken away.
Figure 6:
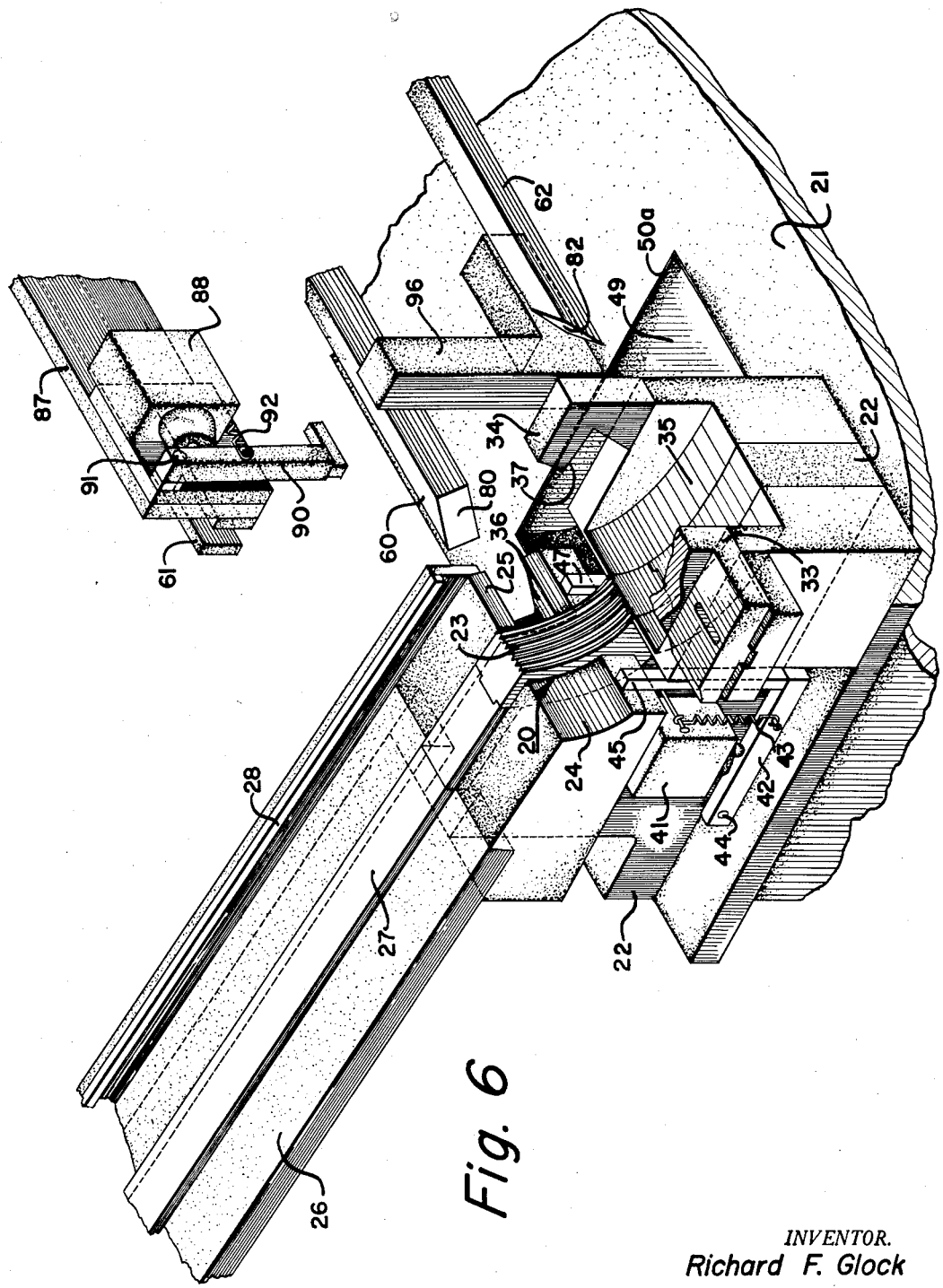
Figure 6 is a perspective elevational view of the work loading station of the machine.

In Figures 3 and 4 there is illustrated a work element 10 adapted for placement in the machine of this invention for removal of mold forms from each of opposite ends of the work element. The work element 10 comprises a rotor assembly 11 for use in a dynamo-electric machine together with mold forms 12 and 13 used in association with the rotor 11 in a manner to provide for die casting of the conductor bars and end rings of the squirrel cage type rotor 11.

The practice of die casting conductor bars and end rings in a squirrel cage rotor is becoming more prevalent. However, while this practice produces a more satisfactory rotor structure that is more uniformly balanced, yet it has injected a difficulty in the manufacture of the rotors of requiring costly manual labor to remove the mold forms from each of opposite ends of the rotor after the die casting operation. This results from the fact that the die cast metal adheres to the surface of the mold forms and relatively high pressure and force are required to remove the mold forms from the rotor. It is the current practice to hammer the mold forms from the rotor. However, in so doing, a considerable number of rotors are damaged, resulting in considerable losses, as well as adding to the manual labor cost of the operation.

In this invention there is provided a machine and a method of removing mold forms from each of opposite ends of a rotor in a manner that the rotors are not damaged, and the operation is performed completely automatic.

In the machine of this invention a work element such as that illustrated in Figures 3 and 4 is introduced into the machine by permitting the element to roll down an incline for automatic placement in the machine. The machine is provided with a work element loading station to receive the work element, and in which loading station the work element is suitably clamped to retain the rotor of the work element rigidly in a fixed position.

When the work element is clamped in the machine automatically by its introduction into the machine, a fluid motor is rendered operative as a result of the clamping operation to advance a plunger which engages one of the mold forms on the work element to strip it from the rotor. Concurrently with this operation the mold element on the opposite side of the rotor is engaged by certain of the machine elements so that when the fluid motor has stripped one of the mold elements from the rotor the fluid motor will be reversed in its operation to strip the other mold element from the opposite side of the rotor. When the fluid motor returns to its starting position, in the course of which it causes the mold element to strip from the rotor and drop from the machine, the fluid motor operating the clamping device will be rendered effective to reverse its operation and unclamp the rotor. The rotor now being free of the clamping elements will drop from the machine and thereby stop the cycle of operation.

Suitable electric controls are provided to cause proper sequential operation of the machine elements to perform the series of movements of the elements required to remove the mold forms from the rotor, the several steps in the operation of the machine being performed automatically after the machine has once been set in operation by introduction of a work element into the machine, the removal of a rotor from the machine causing the automatic operation to cease.

Referring now to the drawings, and particularly to Figures 1 and 2, the machine of this invention comprises mechanism forming a clamping station 20 at which the work element 10 illustrated in Figures 3 and 4 is clamped rigidly in the machine for subsequent processing. The work element is retained in the clamping station by means of a clamping device 30 that includes a clamping element 31 operated by a fluid motor 32 in a reciprocatory movement to clamp and unclamp the work element in the clamping station 20.

When the work element is retained in the clamping station 20 by the clamping device 30, a mold release device 40 is operated to break the mold forms 12 and 13 from the rotor 11, see Figure 4. The mold release device comprises a plunger 41 and a set of pawls 42 that are reciprocated by a fluid motor 43 toward and away from the clamping station 20 to release the mold forms 12 and 13 from a rotor 11 in a manner hereinafter described.

Referring now to the several figures of the drawings that illustrate the machine of this invention in more detail, the machine is illustrated as comprising a bed plate 21 on which the elements comprising the clamping station 20, the clamping device 30 and the mold release device 40 are mounted.

The clamping station 20 comprises an upright member 22 that has an arcuate segment 23 formed with serrations to provide a clamping jaw. At each side of the clamping jaw 23 there is provided the abutments 24 and 25 that are engaged by the mold forms of a work element when the rotor of the work element is clamped against the clamping jaw 23. The abutments 24 and 25 provide means to axially align the axis of the work element 10 with the axis of the mold release device, the abutments preventing any canting of the work element relative to the axis of the mold release device 40.

The work elements 10 are fed into the machine by means of an inclined feed rack 26 that has its lower end terminating immediately above the clamping jaw 23. The feed rack 26 is secured to the upright member 22 in any suitable manner. It will be noted that the rotor 11 of the work element 10 is of smaller diameter than the mold forms 12 and 13, see Figure 4. The feed rack 26 is therefore provided with a raised rail 27 that guides the work element 10 toward the clamping station 20. The central rail 27 is aided in this operation by a side rail 28 that is secured to the inclined feed rack 26.

Abutments 33 and 34 are also secured to the upright 22 to provide means against which a work element 10 stops when dropping into the clamping station 20, the abutments 33 and 34 prevent the work element 10 from falling from the machine. The abutments 33 and 34 are engaged by the mold forms 12 and 13 when the work element 10 drops into the clamping station 20.

The upright 22 and the abutments 33 and 34 are each provided with a cut away portion, the groove of which forms an arcuate recess 35 immediately below the lower edge of the clamping jaw 23. The recess 35 provides a discharge slot or discharge run through which a rotor element leaves the machine after the mold forms 12 and 13 are released from the opposite ends of the rotor.

The abutment 25 is provided with a recess 36, and the abutment 34 is provided with a corresponding recess or cut out portion 37 into which the pawls of the pawl set 42 enter to engage one of the mold halves adhered to the rotor for subsequent removal of the mold half from the rotor, in a manner hereinafter described. An inclined chute 38 has one end thereof positioned adjacent the lower end of the recess 35 to receive the rotor 11 of the work element 10 when it is released from the clamping station 20 after removal of the mold parts from the rotor.

A micro limit switch 41 is provided on one side of the upright 22, see Figures 2 and 5. This limit switch 41 is normally held in closed position by means of an actuating arm and a spring 43, the actuating arm being pivoted on the pin 44. At the opposite end of the actuating arm 42 there is provided a vertical actuating element 45 that has the upper end thereof positioned slightly above the level of the clamping jaw 23. Thus, when a work element 10 drops into the clamping station 20, the limit switch 41 will be operated by downward movement of the actuating element 45 as caused by engagement with the mold element 12 when the work element 10 is in position in the clamping station 20.

Similarly, a micro limit switch 46 is placed on the opposite side of the upright member 22, see Figure 5. The limit switch 46 is constructed in the same manner as the limit switch 41, and has an actuating element 47 that is engaged by the mold section 13 when the work element 10 is in the clamping station 20.

The two limit switches 41 and 46 are provided to insure axial alignment of the work element 10 with the axis of the mold release device 40 before the machine is placed into operation. If the work element 10 is canted in a manner that either of the limit switches 41 and 46 are not closed, the machine cannot start its automatic cycle of operation.

A chute 48 is provided at one side of the clamping station 20, as shown in Figures 1 and 2 to receive the mold member 12 of the work element 10 when released from the rotor 11. A chute 49 connected with an opening 50a in the bed 21 of the machine is provided to receive the mold member 13 when removed from the rotor in a manner hereinafter described.

The clamping device 30 is supported upon an upright 50, the fluid motor 32 being suitably secured to the upright 50. The fluid motor 32 has a plunger 51 that extends from one end of the motor 32 for operation of the clamping device 31. Suitable fluid connections are provided at each end of the fluid motor 32 to cause reciprocation of the plunger 51 when fluid under pressure is delivered alternately to opposite ends of the motor and alternate ends of the fluid motor are correspondingly exhausting when fluid under pressure is delivered to the motor.

The plunger 51 is connected to the clamping device 31, the clamping device 31 having a clamping jaw 52 on one end thereof. The clamping jaw 52 is provided with an arcuate surface 53 that cooperates with the clamping jaw 23 to retain a rotor in fixed position in the machine. The clamping jaw 53 is also serrated to more positively grip the work element placed in the machine. The clamping member 31 is guided in its reciprocatory movement by means of a guide rail 54 provided at each side of the member 31, the rail 54 sliding in a corresponding guide rail provided in the guide member 55 attached to the upright member 50.

The mold release device, more particularly shown in Figures 1 and 5 consists of a platform 56 on which the fluid motor 43 of the mold release device is mounted. The fluid motor 43 is provided with the usual fluid connections at each end thereof to provide for flow of fluid under pressure to alternate ends of the motor and is exhausted therefrom.

The forward end of the fluid motor 43 has a reduced diameter collar portion 57 on which there is mounted a substantially triangular shaped member 58, more specifically shown in Figure 7. The triangular shaped member 58 is secured to the collar 57 by means of fastening bolts 59. The member 58 has extending therefrom the rails 60, 61, and 62 spaced equidistantly from each other and attached to the member 58 at the respective corners of the triangular shaped member.

The rails 60, 61, and 62 are engaged by the pawls 63, 64, and 65 respectively of the pawl set 42, the rails causing actuation of the pawls in a manner hereinafter described.

The pawls 63, 64, and 65 of the pawl set 42 are mounted on a collar 66 that is secured to the plunger 67 extending from the fluid motor 43. The plunger 67 has an extension 41 on the forward end thereof that receives a nut 68 which retains the collar 66 in position on the plunger 67 against an enlargement 69 on the plunger 67.

The collar 66, shown more specifically in Figure 8 is provided with equidistantly spaced slots 70, 71 and 72 that receive the respective pawls 63, 64, and 65. The pawls are retained in position by means of pins 73, 74 and 75 the pins also providing means upon which the pawls 63, 64 and 65 are pivoted.

Each of the pawls 63, 64 and 65 is provided with a cam face 76, 77, and 78 respectively that engages the rails 60, 61, and 62 respectively for actuation of the pawls. Each of the pawls is spring urged outwardly by means of a spring between the pawl and the collar 66 as more particularly illustrated in Figure 5 with reference to the pawl 64, the spring 79 urging the pawl 64 counter-clockwise about the pivot pin 74.

When the pawl set 42 is in the position illustrated in Figure 5, the pawls 63, 64, and 65 are all retained in a position with the forward ends thereof at their maximum radial position. However, when the pawl set 42 is moved in a leftward direction by actuation of the plunger 67, the cam faces 76, 77, and 78 of the pawls 63, 64, and 65 respectively ride upwardly on the tapered faces 80, 81 and 82 on the rails 60, 61, and 62 respectively. This causes rotation of the respective pawls in a counter-clockwise direction, each urged by their spring actuators, to cause the latch ends 83, 84 and 85 to move radially inwardly so as to engage a mold part 13 on the work element 10 as illustrated in Figure 10.

The rail 61 is provided with a longitudinally extending guide slot 86 in which the cam face 77 of the pawl 64 rides in its reciprocal movement along the rail 61. This engagement of the cam face 77 with the slot 86 prevents rotational movement of the pawl set 42 about the axis of the mold release device.

The rail 61 has an upright member 87 attached thereto, the member 87 supporting micro limit switches 88 and 89 at opposite ends thereof. The micro limit switches 88 and 89 are of the type that are normally closed. The micro limit switch 88 has an actuating arm 90 pivoted to the upright 87 by means of a pivot pin 91. The actuating arm is retained in the position illustrated in Figure 5 by means of a tension spring 92 to normally hold the switch 88 in closed position.

Similarly, the limit switch 89 is provided with an actuating arm 93 that is pivoted upon the upright 87 by pivot pin 94. A tension spring 95 is provided to normally urge the switch 89 into closed position. However, when the mold release device 40 is in the position illustrated in Figures 1 and 5, the pawl 64 will engage the actuating arm 93 of the switch 89 to move it counter-clockwise and thereby permit the switch 89 to move to open position.

An upright member 96 secured to the machine bed 21 is positioned adjacent the plunger extension 41 to provide for removal of the mold element 13 from the plunger extension 41 upon retraction thereof by the fluid motor 43 the mold element dropping into the chute 49 for delivery from the machine.

In Figure 12 there is illustrated the pneumatic system for operation of the clamping motor 32 and the motor 43 for actuating the mold release device. Fluid under pressure is supplied to the fluid motors 32 and 43 through a supply line 100, in this instance supplying air under pressure. Air under pressure is delivered from the supply line 100 through the lines 101, 102, 103 to one side of the fluid motor 32. The opposite side of the fluid motor is connected through pipes 104 and 105 to an exhaust 106. A solenoid operated valve 107 is placed between the lines 101, 102, 104, 105 to provide the aforesaid connections. The solenoid valve 107 has cross connections 108 and 109 that provide for reversing the delivery of air under pressure to the line 104 and reversing the connection of the exhaust line 105 to the line 102.

A pressure switch 110 is connected with the pressure line 102 to provide for retaining the switch in open position as illustrated in Figure 12 so long as pressure remains in the lines 102 and 103 holding the fluid motor 32 in retracted position. However, when the motor 32 is connected to the exhaust upon operation of the solenoid valve 107, the pressure in the line 102 and the switch 110 decays to allow the switch 110 to close circuit through its contacts 111.

The fluid motor 43 for operating the mold release device 40 is connected with the supply line 100 through the lines 112 and 113 whereby to supply fluid to the left hand end of the fluid motor 43 to normally maintain the mold release device in retracted position as shown in Figures 1 and 5. The opposite end of the fluid motor is connected through the lines 114 and 115 to the exhaust 106.

A solenoid actuated valve 116 provides the connection between the lines 112, 113 and the lines 114, 115. The valve 116 is provided with cross connections 117 and 118 to provide for reversing the connections of the lines 112 and 115 with the fluid motor 43.

The mechanical operation of the machine is such that a work element 10 is placed upon the inclined feed rack 26 to roll down the same into the clamping station 20 of the machine. When the work element 10 is within the clamping station 20, the rotor 11 of the work element engages the clamping jaw 23. The mold members 12 and 13 are in engagement with the abutments 24 and 25 respectively whereby to align the axis of the work element 10 with the axis of the mold release device 40.

The abutment members 24 and 25 prevent the work element 10 from canting in the clamping station, and insure that both limit switch 41 and 46 will be operated to initiate an automatic cycle of operation of the machine.

The normal inactive position of the machine elements is illustrated in Figures 1, 2, and 5, the clamping device and the mold release device both being in the retracted position. At this time the solenoid valves 107 and 116, see Figure 12, are in the position to direct air under pressure through the line 103 to the fluid motor 32 and through the line 113 to the fluid motor 43, thus holding the pistons of these motors in their retracted position. Also, the pressure in the line 102 maintains the pressure switch 110 in open position to break electric circuit through its contacts 111.

When the work element 10 has dropped into the clamping station 20 resulting in operation of the micro limit switches 41 and 46, electric circuit controls, hereinafter described, are rendered active to activate the fluid control valve 107 to cause reverse of the flow of fluid under pressure to the fluid motor 32 to cause the clamping element 31 to move in a leftward direction, as viewed in Figure 2.

The advancement of the clamping element 31 will cause the clamping jaw 52 to engage the rotor 11 of a work element now in the clamping station to rigidly clamp and retain the same between the clamping jaws 23 and 53.

When the delivery of pressure fluid was transferred from the line 101 to the line 104 to advance the piston of the clamping motor 32, line 102 was connected to the exhaust line 105. This results in a decaying pressure in the line 102, ultimately resulting in closure of the pressure switch 110.

Closure of the pressure switch 110 causes actuation of other electric controls to render active the solenoid control valve 116 and reverse the delivery of fluid under pressure from line 113 to line 114 to advance the piston of the fluid motor 43. Concurrently, line 113 from the motor 43 is connected with the exhaust line 115.

Advancement of the piston of the fluid motor 43 causes the leftward advancement of the plunger 67 and the pawl set 42, as viewed in Figure 5. At this time the work element 10 is clamped between the clamping jaws 23 and 52, as viewed in Figure 5.

As the plunger extension 41 and the pawl set 42 advances in a leftward direction toward the work element 10 the plunger extension 41 engages a shaft element 201 that is secured to the mold member 12 and extends through the rotor 11 and mold member 13 to axially align the mold members and the laminations forming the rotor. Leftward movement of the plunger extension 41 forces the mold element 12 in the leftward direction to release it from the rotor 11, the plunger extension 41 entering the bore previously occupied by the shaft 201 of the work element 10. After shaft 201 of the mold element 12 is moved leftwardly through the work element 10, the mold element 12 and its attached shaft 201 are dropped into the chute 48 as illustrated in Figure 10, for delivery from the machine, and into a suitable collecting container.

Continued leftward movement of the plunger 67 and the attached pawl set 42 causes the latch ends 83, 84, and 85 of the pawls 63, 64, and 65 respectively to engage an annular recess 202 provided in the mold element 13 for this purpose. The latch ends of the pawls are moved radially inwardly by the action of the springs engaging the pawls urging them in a counterclockwise direction about their respective pivots, the cam faces 76, 77 and 78 on the pawls riding radially outwardly on the angular faces 80, 81 and 82 of the rails 60, 61, and 62, as illustrated in Figure 10.

When the pawl set 42 engages the mold member 13 of the work element 10, as illustrated in Figure 10, the forward limit switch 88 is effective to actuate the electric control system to cause deenergization of the solenoid valve 116 and permit it to return to the position illustrated in Figure 12 whereby fluid under pressure is delivered to the line 113 connected with the motor 43 and the line 114 is connected to exhaust, thus causing retraction movement of the plunger 67 and the fluid motor 43. Retraction movement of the fluid motor 43 causes the mold member 13 to be released from the rotor 11 of the work element. When the mold element 13 is released from the work element 10, the mold member 13 will then be carried upon the plunger extension 41 that is still positioned within the rotor 11 as shown in Figure 11.

As soon as the plunger 67 is moved in a rightward direction a sufficient distance to cause engagement of the cam faces 76, 77, 78 with the inclined surfaces 80, 81, and 82 of the rails 60, 61 and 62, the pawls 63, 64, and 65 will be caused to rotate clockwise about their respective pivots to release their latch ends 83, 84, 85 of the respective pawls from the annular groove 202 provided in the mold member 13, thus leaving the mold member 13 free on the shaft extension 41 of the plunger 67. The retraction movement of the plunger 67 will continue until the mold member 13 engages the upright 96, as shown in Figure 9, whereby the extension plunger 41 will be withdrawn from the mold member 13 to permit it to drop into the chute 49 and into a suitable collection container. The retraction movement of the plunger 67 will still continue until the limit switch 89 is actuated by the pawl 64 to cause actuation of the electrical system to deenergize the solenoid valve 107 and allow it to return to the position illustrated in Figure 12 to reconnect the pressure line 101 with the line 103 and connect the line 104 with the exhaust line 105. This action produces retraction movement of the clamping member 31 to unclamp the rotor 11 in the clamping station, and allow the rotor to drop into the chute 38 for removal from the machine. Concurrently pressure is reapplied to the pressure switch 110.

When the rotor 11 drops from the clamping station, the limit switches 41 and 46 are opened to thereby prevent further operation of the machine until another work element drops into the clamping station.

In Figure 13 there is diagrammatically illustrated an electric system and controls for providing for automatic operation of the machine through at least a single cycle of operation. The electric circuit includes a starting push button 213 which connects relay R1 with the power lines L1 and L2. When relay R1 is actuated, contacts R1a provide a holding circuit around the starting button 213 to retain the master circuit including the power lines L1a and L2 energized. When the power line L1a becomes energized, relay R4 is energized through the normally closed contacts R2a, R5a, and R6a. Energization of relay R4 causes contact R4a to maintain a holding circuit around contacts R5a and R6a. Simultaneously, contacts R4b in series with the solenoid 107 are closed. However, the machine will not be initiated in a semi-automatic cycle of operation until a work element is dropped into a clamping station.

When a work element 10 drops into a clamping station 20 of the machine, the limit switches 41 and 46 are closed thereby energizing relays R5 and R6. Energization of relay R5 opens contacts R5a and closes contacts R5b. Similarly, energization of relay R6 opens relay contacts R6a and closes contacts R6b. Relay R4 is retained energized by the holding circuit through contacts R4a being now closed.

Since contacts R4b, previously closed by relay R4, and are still closed because of the holding circuit for relay R4 through contacts for R4a, closing of the contacts R5b and R6b provides a circuit to solenoid 107 to energize the same and thereby cause advancement of the clamping cylinder in the manner heretofore described. When the air pressure in the line 102 decays, the pressure switch 110 will close to thereby energize relay R3 which closes contacts R3a and R3b. At this time the limit switch 89 is open whereas limit switch 88 is closed as a result of the retracted position of the mold release device. Thus, when contacts R3a are closed by relay R3 through the now closed limit switch 88 and relay contacts R2b, the solenoid valve 116 is energized. Relay R3 has thus set up a circuit possibility through contacts R3b when the limit switch 89 closes.

However, the present energization of solenoid 116 by closing of contacts R3a causes reversal of the application of fluid under pressure to the fluid motor 43 of the mold releasing device to cause its forward advancement resulting in removal of mold element 12 from the rotor 11 and engagement of the pawl set 42 with the mold member 13 in a manner heretofore described.

When the mold release device begins its advancement stroke, limit switch 89 closes to thereby set up a holding circuit that includes the wires 203 and 204 to retain the solenoid 107 and the valve 116 energized during the advancing stroke of the mold release device to release the mold element 12 from the rotor 11 and cause engagement of the pawl set 42 with the mold element 13 in the manner heretofore described.

When the mold release device 40 is at its full advanced position, the limit switch 88 will be moved from its closed position to a temporary closed position shown in dotted lines thereby making circuit to relay R2 and deenergizing circuit to the solenoid valve 116. Deenergizing solenoid 116 causes retraction movement of the fluid motor 43 and thus release of mold member 13 from the rotor in the manner heretofore described. Further, when relay R2 was energized contacts R2a and R2b were opened and contacts R2c were closed. Opening of contacts R2a deenergizes relay R4, thereby opening contacts R4a and R4b. This breaks the holding circuit previously made by contacts R4a and sets up a deenergized circuit through contacts R4b that are temporarily by-passed by the previous closing of the limit switch 89 and contacts R3b. Relay R4 is hereafter ineffective.

Opening of contacts R2b upon energization of R2 sets up an open circuit through solenoid 116 when the limit switch 88 closes to its full line position upon start of the retraction movement of the mold releasing device 40. When the limit switch 89 returns to its full line position, solenoid 116 cannot be reenergized for the reason that contacts R2b are now held open by energization of relay R2 through contacts R2c, whereupon the fluid motor 43 will continue its retraction movement, returning to its full retracted position.

When the mold release device returns to its retracted position, limit switch 89 is opened thereby breaking circuit to the lines 203 and 204 to deenergize the solenoid 107 and relay R2. This results in causing the holding circuit through contacts R2c to open and reclosing of contacts R2b and R2a to set up these contacts for a subsequent operation.

Deenergization of solenoid 107 causes reversal of the flow of fluid under pressure to the clamping motor 32 to retract the same and thus unclamp the rotor previously held in the clamping station 20 of the machine. As the rotor becomes unclamped, it drops from the machine to release the limit switches 41 and 46 whereby to cause these switches to open and deenergize relays R5 and R6. This operation effects opening of contacts R5b and R6b and closing of contacts R5a and R6a to reestablish circuit through relay R4 for a new cycle of operation when another rotor drops into the machine again closing limit switches 41 and 46.

While the form of embodiment of the invention as herein disclosed constitutes a preferred form, it is to be understood that other forms might be adopted as may come within the scope of the claims which follow.

What is claimed is as follows:

1. A machine for removing parts from opposite sides of a workpiece, comprising in the combination, a longitudinally extending feed rack, a first stationary clamping jaw positioned at one end of said feed rack below the level of the said end to receive a workpiece off the end of the feed rack, abutment means forward of the first clamping jaw in the direction of movement of a workpiece to position a workpiece on the clamping jaw, a second clamping jaw movable toward and away from said first jaw in the plane thereof diametrically opposite thereto to secure a workpiece therebetween, a mold release device movable normal to the plane of said clamping jaws and including an axially extending plunger member movable between said jaws on the axis of a workpiece contained therein and a pawl set having a plurality of pawls spaced radially equidistantly about said plunger member and movable therewith, and fixed rail means engaged by said pawls and having cam surfaces for actuation of the pawls radially relative to said plunger member during longitudinal movement of said plunger member and said pawl set relative to said rail means toward and away from said clamping jaws.

2. In combination, a machine bed, a vertical support member on said bed having a portion thereof forming a stationary clamping jaw, a longitudinally extending feed track positioned above the level of said stationary jaw with one end of the track terminating at the said jaw, and above the level thereof, a second clamping jaw movable toward and away from said first jaw in the plane thereof and diametrically opposite thereto, said jaws each engaging only a portion of the periphery of a workpiece retained therebetween, said support member having the portion thereof in the plane of said jaws and below the level of said stationary jaw cut away forming thereby a discharge chute in longitudinal alignment with said track through which a workpiece discharges when released from between said jaws, motor means supported on said bed and connected with said movable jaw to operate the same, and a mold release device supported on said bed with the axis thereof normal to the plane of said jaws and including a plunger member movable between said jaws on the axis of a workpiece retained therebetween to engage one mold part and remove the same from a workpiece and a plurality of pawls radially positioned about said plunger member for engaging a second mold part and removing the same from a workpiece, said mold release device also including longitudinally extending stationary rail means having cam surfaces engaged by said pawls for radial actuation of the said pawls during longitudinal movement thereof toward and away from said jaws.

3. Apparatus for removing mold parts from opposite sides of a workpiece, comprising in combination, a machine bed, a stationary clamping jaw on said bed, a movable clamping jaw supported on said bed for movement toward and away from said stationary jaw, a stationary abutment on said bed between said jaws having a greater width than the width of said jaws to align a workpiece between said jaws and having an opening through the same aligned with said jaws to receive a workpiece through said abutment when released from said jaws and forming with said jaws a clamping station having an axis normal to the plane of said jaws, a feed rack aligned with said stationary jaw to feed workpieces to said jaws and a receiving rack aligned with said opening in said abutment to receive workpieces released from said jaws and passing through said opening, a fluid motor on said bed having a reciprocable plunger on the axis of said clamping station, a collar on said plunger supporting a plurality of pawls pivoted on said collar for radial movement and positioned radially about said plunger, the free end of said plunger extending substantially forwardly of said pawls, a plurality of stationary rails disposed radially about said plunger each of which is engaged by one of said pawls, spring means between said collar and each of said pawls effecting engagement of one end of said pawls with said rails and cam means on the forward free ends of said rails to effect radial movement of said pawls toward said plunger with said plunger advanced into position with the free end thereof between said jaws.

4. Apparatus for removing mold parts from opposite sides of a workpiece, comprising in combination, a machine bed, a stationary clamping jaw on said bed, a movable clamping jaw supported on said bed for movement toward and away from said stationary jaw, a stationary abutment on said bed between said jaws having a greater width than the width of said jaws to align a workpiece between said jaws and having an opening through the same aligned with said jaws to receive a workpiece through said abutment when released from said jaws and forming with said jaws a clamping station having an axis normal to the plane of said jaws, a feed rack aligned with said stationary jaw to feed workpieces to said jaws and a receiving rack aligned with said opening in said abutment to receive workpieces released from said jaws and passing through said opening, a fluid motor on said bed having a reciprocable plunger on the axis of said clamping station, a collar on said plunger supporting a plurality of pawls pivoted on said collar for radial movement and positioned radially about said plunger, the free end of said plunger extending substantially forwardly of said pawls, a plurality of stationary rails disposed radially about said plunger each of which is engaged by one of said pawls, spring means between said collar and each of said pawls effecting engagement of one end of said pawls with said rails and cam means on the forward free ends of said rails to effect radial movement of said pawls toward said plunger with said plunger advanced into position with the free end thereof between said jaws, one of said rails having a longitudinally extending groove slidably receiving a portion of one of said pawls to prevent rotation of said collar on said plunger.

5. Apparatus for removing mold parts from opposite sides of a workpiece, comprising in combination, a machine bed, a stationary clamping jaw on said bed having a clamping surface in the form of a segment of a circle, a movable clamping jaw supported on said bed for movement toward and away from said stationary jaw and having a clamping surface in the form of a segment of a circle, said movable jaw being positioned diametrically opposite said stationary jaw, a stationary abutment on said bed between said jaws having a width greater than the width of said jaws with a workpiece engaging surface in the form of a segment of a circle and having an opening through the same of a width greater than the width of said jaws but less than the width of said abutment and aligned with said jaws to receive a workpiece through said abutment when released from said jaws and forming with said jaws a clamping station having an axis normal to the plane of said jaws, a fluid motor on said bed having a reciprocable plunger on the axis of said clamping station, a collar on said plunger supporting a plurality of pawls pivoted on said collar for radial movement and positioned radially about said plunger, the free end of said plunger extending substantially forwardly of said pawls, a plurality of stationary rails disposed radially about said plunger each of which is engaged by one of said pawls, spring means between said collar and each of said pawls effecting engagement of one end of said pawls with said rails and cam means on the forward free ends of said rails to effect radial movement of said pawls toward said plunger with said plunger advanced into position with the free end thereof between said jaws.

References Cited in the file of this patent

UNITED STATES PATENTS

| Number | Name | Date |
|---|---|---|
| 395,330 | Jones | Jan. 1, 1889 |
| 512,973 | Keiser | Jan. 16, 1894 |
| 1,344,409 | Ladd | June 22, 1920 |
| 1,496,134 | Rumgay | June 3, 1924 |
| 1,607,677 | Korsmo | Nov. 23, 1926 |
| 1,735,049 | Lester | Nov. 12, 1929 |
| 1,942,919 | Eurich et al. | Jan. 9, 1934 |
| 1,977,220 | Wyant | Oct. 16, 1934 |
| 2,065,213 | Dolan et al. | Dec. 22, 1936 |
| 2,225,292 | Andrews et al. | Dec. 17, 1940 |
| 2,475,396 | Lester | July 5, 1949 |